(12) United States Patent
De Falco et al.

(10) Patent No.: US 12,500,556 B2
(45) Date of Patent: Dec. 16, 2025

(54) DYNAMIC ADAPTIVE BIASING FOR AMPLIFICATION CIRCUITRY

(71) Applicant: QUALCOMM Incorporated, San Diego, CA (US)

(72) Inventors: Paolo Enrico De Falco, San Diego, CA (US); Baseer Faheem, San Diego, CA (US); David Angel Calvillo Cortes, San Diego, CA (US); Antonino Scuderi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/339,714

(22) Filed: Jun. 22, 2023

(65) Prior Publication Data

US 2024/0429879 A1    Dec. 26, 2024

(51) Int. Cl.
*H03F 3/21*    (2006.01)
*H03F 1/02*    (2006.01)
*H04B 1/04*    (2006.01)

(52) U.S. Cl.
CPC .......... *H03F 3/211* (2013.01); *H03F 1/0216* (2013.01); *H03F 1/0277* (2013.01); *H03F 2200/294* (2013.01); *H03F 2200/451* (2013.01); *H04B 2001/0416* (2013.01)

(58) Field of Classification Search
CPC ...... H03F 3/211; H03F 1/0227; H03F 1/0216; H03F 2200/294; H04B 2001/0416
See application file for complete search history.

(56) References Cited

U.S. PATENT DOCUMENTS

| 2012/0299659 | A1 | 11/2012 | Sankalp et al. |
| 2016/0241292 | A1* | 8/2016 | Ripley ............... H03F 1/0227 |
| 2018/0175800 | A1 | 6/2018 | Hayes et al. |
| 2019/0379335 | A1 | 12/2019 | Scott et al. |

FOREIGN PATENT DOCUMENTS

| WO | 2022137642 A1 | 6/2022 |
| WO | 2022197334 A1 | 9/2022 |

OTHER PUBLICATIONS

International Search Report and Written Opinion—PCT/US2024/030537—ISA/EPO—Aug. 21, 2024.
Ahmed A., et al., "Gate Bias Modulation for Doherty Power Amplifier", Proceedings of the 48th European Microwave Conference (EuMC), Sep. 23-27, 2018, pp. 531-534, DOI: 10.23919/EuMC.2018.8541738.
Ryu N., et al., "CMOS Doherty Amplifier With Variable Balun Transformer and Adaptive Bias Control for Wireless LAN Application", IEEE Journal of Solid-State Circuits, Jun. 2014, vol. 49, No. 6, pp. 1356-1365, DOI: 10.1109/JSSC.2014.2313561.

* cited by examiner

*Primary Examiner* — Rahel Guarino
(74) *Attorney, Agent, or Firm* — Patterson + Sheridan, L.L.P.

(57) ABSTRACT

Certain aspects of the present disclosure generally relate to electronic components and, more particularly, to circuitry for signal amplification for transmission. One example apparatus generally includes: a modem; a controller; a feedforward path coupled between the modem and the bias controller; and an amplifier having a main amplification path and an auxiliary amplification path, wherein the controller is configured to provide at least one bias signal for biasing the auxiliary amplification path based on information associated with a transmission signal, the information being provided by the modem to the controller via the feedforward path.

27 Claims, 10 Drawing Sheets

DYNAMIC ADAPTIVE BIASING FOR AMPLIFICATION CIRCUITRY

BACKGROUND

Field of the Disclosure

Certain aspects of the present disclosure generally relate to electronic components and, more particularly, to circuitry for signal amplification for transmission.

Description of Related Art

Electronic devices include computing devices such as desktop computers, notebook computers, tablet computers, smartphones, wearable devices like a smartwatch, internet servers, and so forth. These various electronic devices provide information, entertainment, social interaction, security, safety, productivity, transportation, manufacturing, and other services to human users. These various electronic devices depend on wireless communications for many of their functions. Wireless communication systems and devices are widely deployed to provide various types of communication content such as voice, video, packet data, messaging, broadcast, and so on. These systems may be capable of supporting communication with multiple users by sharing the available system resources (e.g., time, frequency, and power). Examples of such systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system or a New Radio (NR) system). Wireless devices may include transmitters for processing signals for transmission via antennas. A transmitter may include one or more digital-to-analog converters (DACs) configured to convert signals from the digital domain to the analog domain for further processing (e.g., amplification) prior to transmission.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure are directed towards an apparatus for wireless communication. The apparatus generally includes: a modem; a controller; a feedforward path coupled between the modem and the bias controller; and an amplifier having a main amplification path and an auxiliary amplification path, wherein the controller is configured to provide at least one bias signal for biasing the auxiliary amplification path based on information associated with a transmission signal, the information being provided by the modem to the controller via the feedforward path.

Certain aspects of the present disclosure are directed towards a method for wireless communication. The method generally includes: determining, via a modem, information associated with a transmission signal; providing the information to a controller via a feedforward path between the modem and the controller; generating, via the controller, at least one bias signal for biasing an amplifier based on the information provided via the feedforward path; generating a first amplified signal via a main amplification path of the amplifier; generating a second amplified signal via an auxiliary amplification path of the amplifier based on the at least one bias signal; and transmitting, via an antenna, the transmission signal based on the first amplified signal and the second amplified signal.

Certain aspects of the present disclosure are directed towards an apparatus for wireless communication. The apparatus generally includes: means for determining information associated with a transmission signal; means for providing the information to a controller between the modem and the controller; means for generating at least one bias signal for biasing an amplifier based on the information provided via the feedforward path; an amplifier including a main amplification path configured to generate a first amplified signal and an auxiliary amplification path configured to generate a second amplified signal based on the at least one bias signal; and means for transmitting the transmission signal based on the first amplified signal and the second amplified signal.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure generally relate to techniques and apparatus for dynamic biasing of an amplifier for signal transmission. The amplifier may be implemented, for example, as a Doherty amplifier with a main amplification path and an auxiliary amplification path. In some aspects, a controller may receive information (e.g., a bias code or configuration parameter, such as a maximum power reduction (MPR) parameter) from a modem via a feedforward path. Based on the information from the modem, the controller may generate a bias signal for biasing the amplifier (e.g., for biasing a driver amplifier (DA) and/or a power amplifier (PA) of the auxiliary path). For instance, the bias signal may be a bias current generated by a current digital-to-analog converter (IDAC) and provided to a bias circuit of the amplifier. The bias circuit may generate, via one or more current mirrors, bias currents for the DA and/or PA, based on the current from the IDAC. Thus, the bias signal(s) for the amplifier(s) may be dynamically adjusted for transmission signals with different peak-to-average power ratios (PAPRs).

Example Wireless Communications

Figure 1:
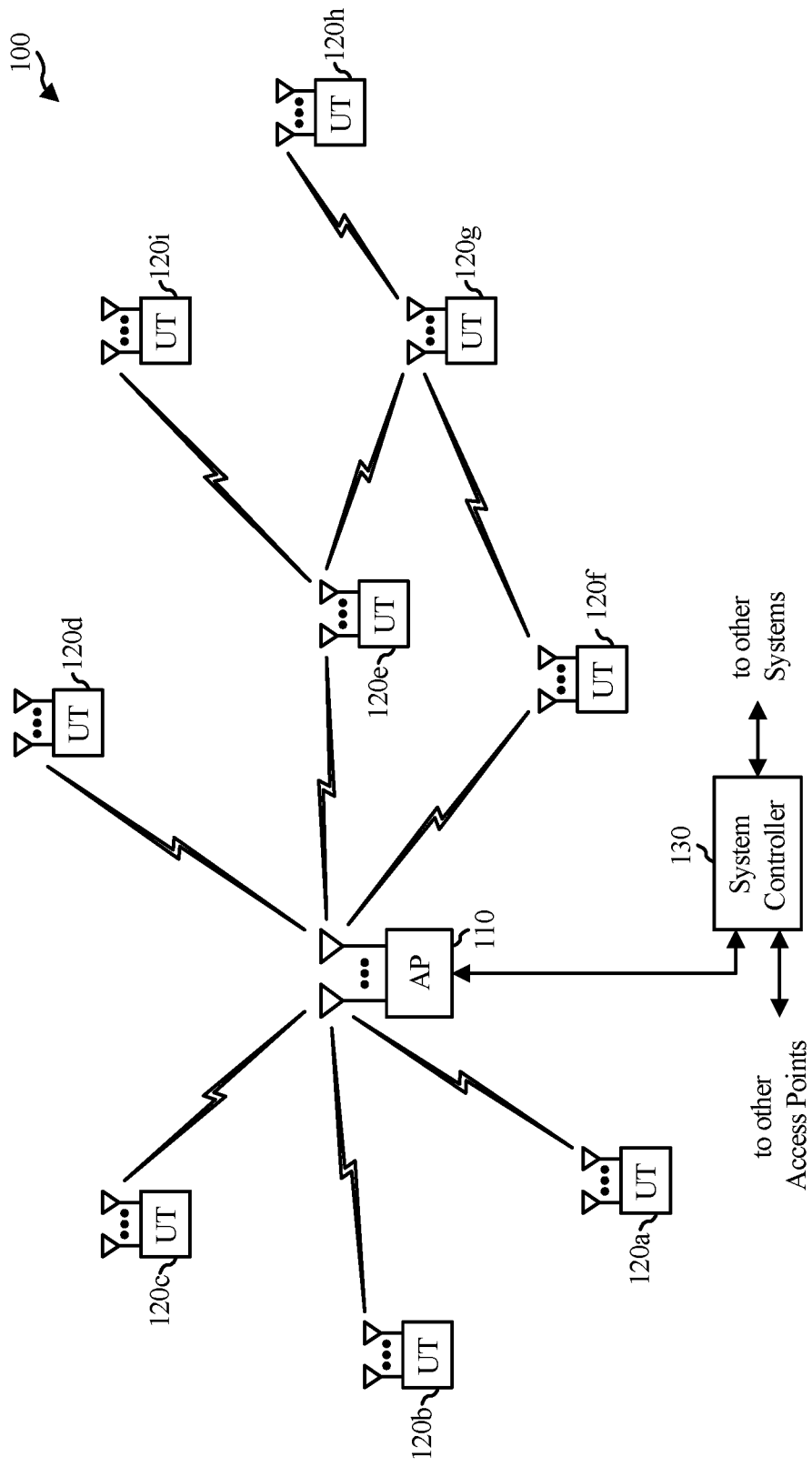
FIG. 1 is a diagram of an example wireless communications network, in accordance with certain aspects of the present disclosure.

FIG. 1 illustrates a wireless communications system 100 with access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), a next generation Node B (gNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

Wireless communications system 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set Nu of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The Nu selected user terminals can have the same or different number of antennas.

Wireless communications system 100 may be a time division duplex (TDD) system or a frequency division duplex (FDD) system. For a TDD system, the downlink and uplink share the same frequency band. For an FDD system, the downlink and uplink use different frequency bands. Wireless communications system 100 may also utilize a single carrier or multiple carriers for transmission. Each user terminal 120 may be equipped with a single antenna (e.g., to keep costs down) or multiple antennas (e.g., where the additional cost can be supported). In some aspects, the user terminal 120 or access point 110 may include an amplifier that may be biased based on information from a modem such that the biasing for the amplifier may be dynamically adjusted for transmission signals with different PAPRs.

Figure 2:
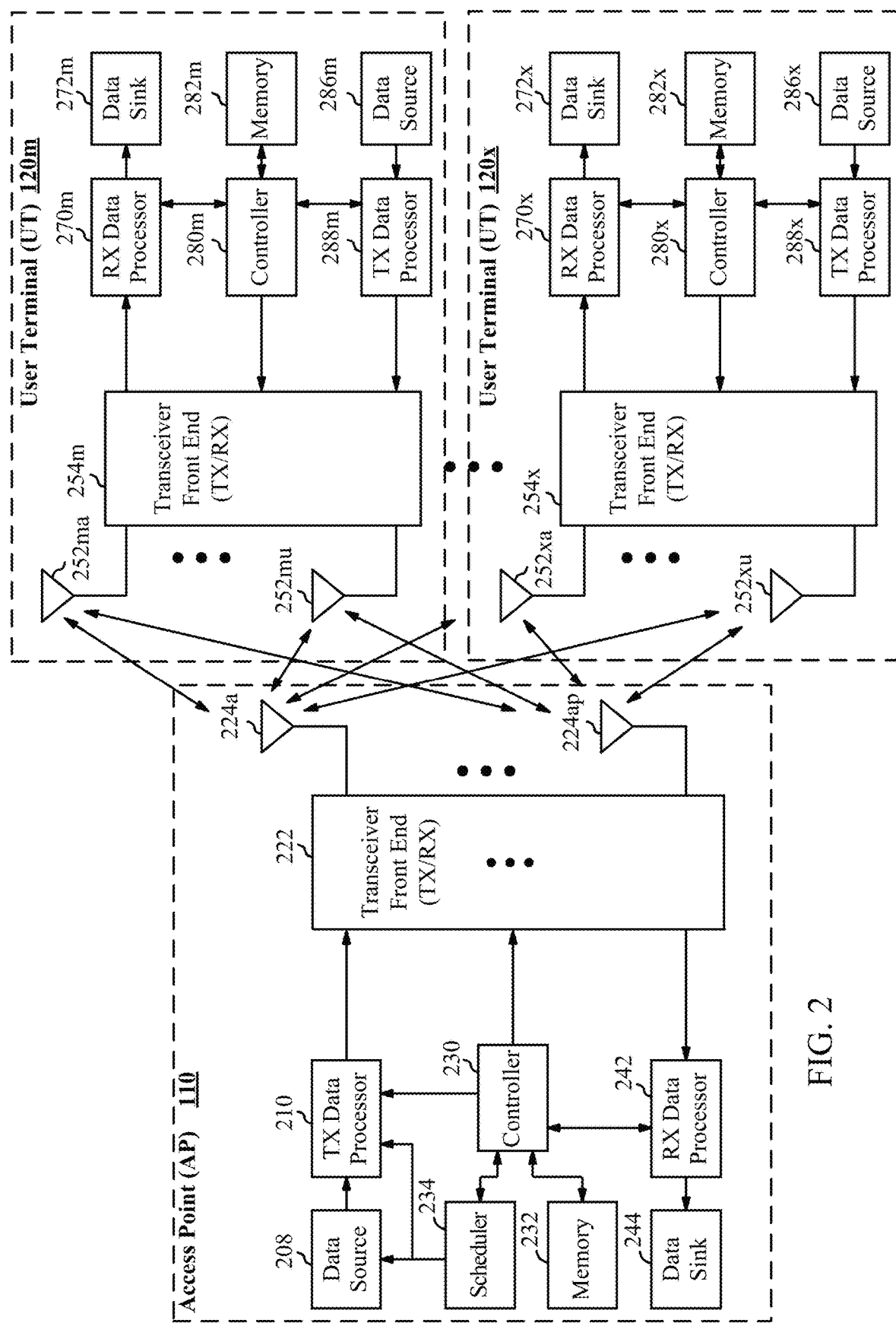
FIG. 2 is a block diagram of an example access point (AP) and example user terminals, in accordance with certain aspects of the present disclosure.

FIG. 2 shows a block diagram of access point 110 and two user terminals 120m and 120x in the wireless communications system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ a user terminals are selected for simultaneous transmission on the uplink, $N_{dn}$ user terminals are selected for simultaneous transmission on the downlink, $N_{up}$ a may or may not be equal to $N_{dn}$, and $N_{up}$ a and $N_{dn}$ may be static values or can change for each scheduling interval. Beamsteering, beamforming, or some other spatial processing technique may be used at the access point and/or user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ a of user terminals 120 may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ a user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 (e.g., corresponding to data sink 272 of UT) for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one or more of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal. In some aspects, the transceiver front end 254 or 222 may include an amplifier that may be biased based on information from a modem (e.g., controller 230) such that the biasing for the amplifier may be dynamically adjusted for transmission signals with different PAPRs.

Figure 3:
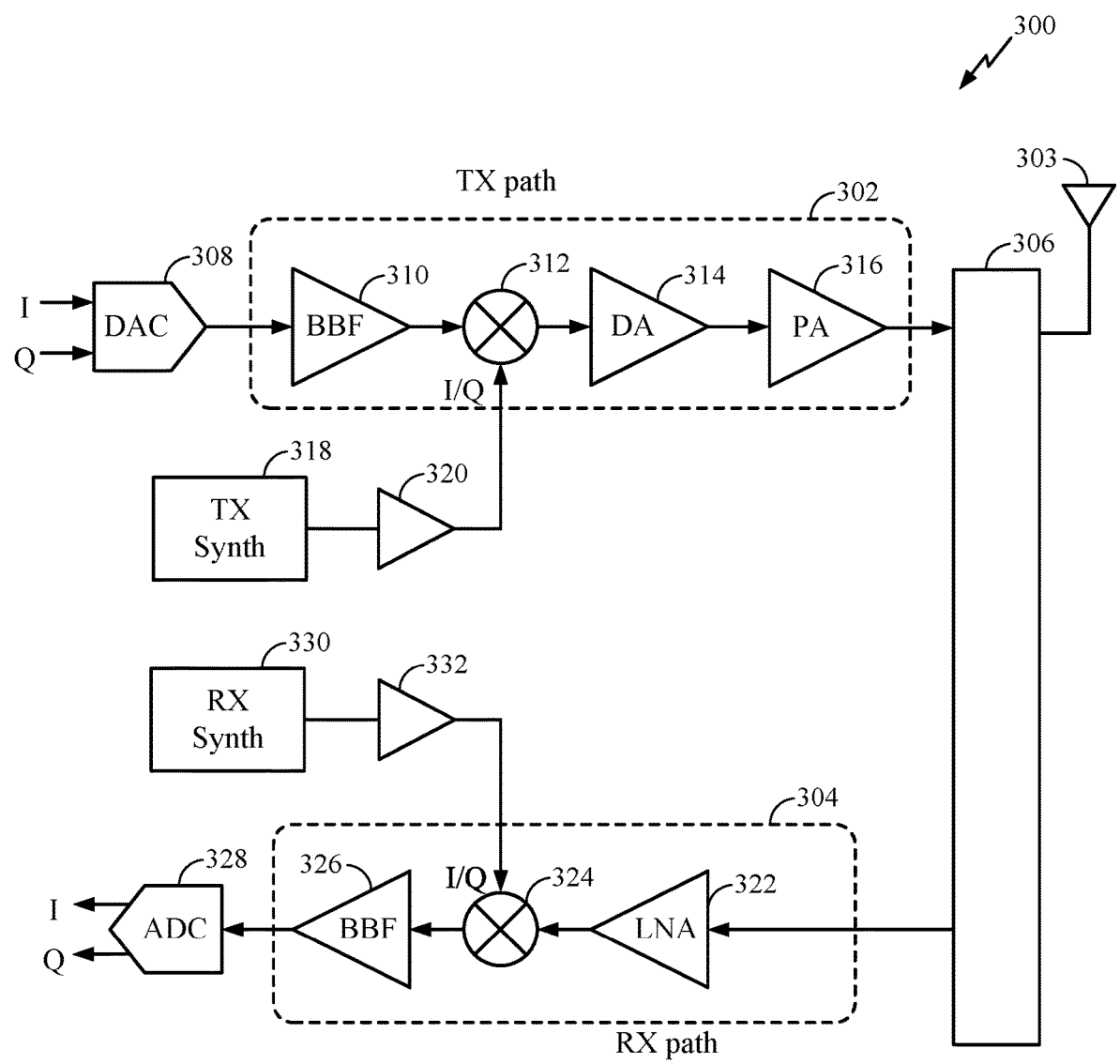
FIG. 3 is a block diagram of an example transceiver front end, in accordance with certain aspects of the present disclosure.

FIG. 3 is a block diagram of an example transceiver front end 300, such as transceiver front ends 222, 254 in FIG. 2, in which aspects of the present disclosure may be practiced.

The transceiver front end 300 includes at least one transmit (TX) path 302 (also known as a transmit chain) for transmitting signals via one or more antennas and at least one receive (RX) path 304 (also known as a receive chain) for receiving signals via the one or more antennas. When the TX path 302 and the RX path 304 share an antenna 303, the paths may be connected with the antenna via an interface 306, which may include any of various suitable RF devices, such as a switch, a duplexer, a diplexer, a multiplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, the DA 314, and the PA 316 may be included in a radio frequency integrated circuit (RFIC). In some cases, the PA 316 may be external to the RFIC.

The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency-conversion process produces the sum and difference frequencies of the LO frequency and the frequencies of the baseband signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303. While one mixer 312 is illustrated, several mixers may be used to upconvert the filtered baseband signals to one or more intermediate frequencies and to thereafter upconvert the intermediate frequency (IF) signals to a frequency for transmission. In some aspects, the DA 314 and/or the PA 316 may be implemented as a Doherty amplifier having a main amplification path and an auxiliary amplification path, where at least the auxiliary amplification path may be biased based on information from a modem such that the biasing for the amplifier may be dynamically adjusted for transmission signals with different PAPRs.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (e.g., downconvert). The baseband signals output by the mixer 324 may be filtered by the BBF 326 before being converted by an analog-to-digital converter (ADC) 328 to digital I and/or Q signals for digital signal processing.

Certain transceivers may employ a variable-frequency oscillator (e.g., a voltage-controlled oscillator (VCO) or a digitally controlled oscillator (DCO)) to generate a stable, tunable LO signal with a particular tuning range. Thus, the transmit LO signal may be produced by a TX frequency synthesizer 318, which may be buffered or amplified by amplifier 320 before being mixed with the baseband signals in the mixer 312. Similarly, the receive LO signal may be produced by an RX frequency synthesizer 330, which may be buffered or amplified by amplifier 332 before being mixed with the RF signals in the mixer 324. For certain aspects, a single frequency synthesizer may be used for both the TX path 302 and the RX path 304. In certain aspects, the TX frequency synthesizer 318 and/or RX frequency synthesizer 330 may include a frequency multiplier, such as a frequency doubler, that is driven by an oscillator (e.g., a VCO) in the frequency synthesizer.

While FIGS. 1-3 provide wireless communications as an example application in which certain aspects of the present disclosure may be implemented to facilitate understanding, certain aspects described herein may be used for amplification in any of various other suitable systems (e.g., an audio system, a high-speed serializer/deserializer (SerDes) system, a video system, or other electronic system).

Example Techniques for Biasing Amplification Circuitry

In some aspects, a power amplifier (e.g., PA 316) may be implemented as a Doherty PA. A Doherty PA includes a main amplification path (e.g., including a main driver amplifier and a main power amplifier) and an auxiliary amplification path (e.g., including an auxiliary driver amplifier and an auxiliary power amplifier). The main and auxiliary amplification paths may be coupled to an output of the Doherty PA and used to efficiently generate an amplified signal. The main amplification path may be used for amplifying an input signal, and the auxiliary amplification path may be enabled or otherwise invoked for amplifying high-power components (e.g., the peaks) of the input signal. The Doherty PA increases the average efficiency of the amplification circuitry when amplifying variable envelope signals. For example, the auxiliary amplification path may be used to facilitate amplification of peak power signal components during signal transmission, as described in more detail herein.

While some examples are described with respect to a Doherty amplifier to facilitate understanding, certain aspects of the present disclosure may be applied to any suitable type of amplifier, such as a sequential amplifier. Similar to a Doherty amplifier (e.g., PA), a sequential amplifier may include a main amplification path and a peaking amplification path (e.g., an auxiliary amplification path) for amplifying peak power components. For a sequential amplifier, amplified signals from the main and auxiliary amplification paths may be provided to a branch line coupler. Certain aspects may also be applied for dynamically biasing outphasing PAs, balanced PAs, and load-modulated balanced Pas, for example.

Figure 4:
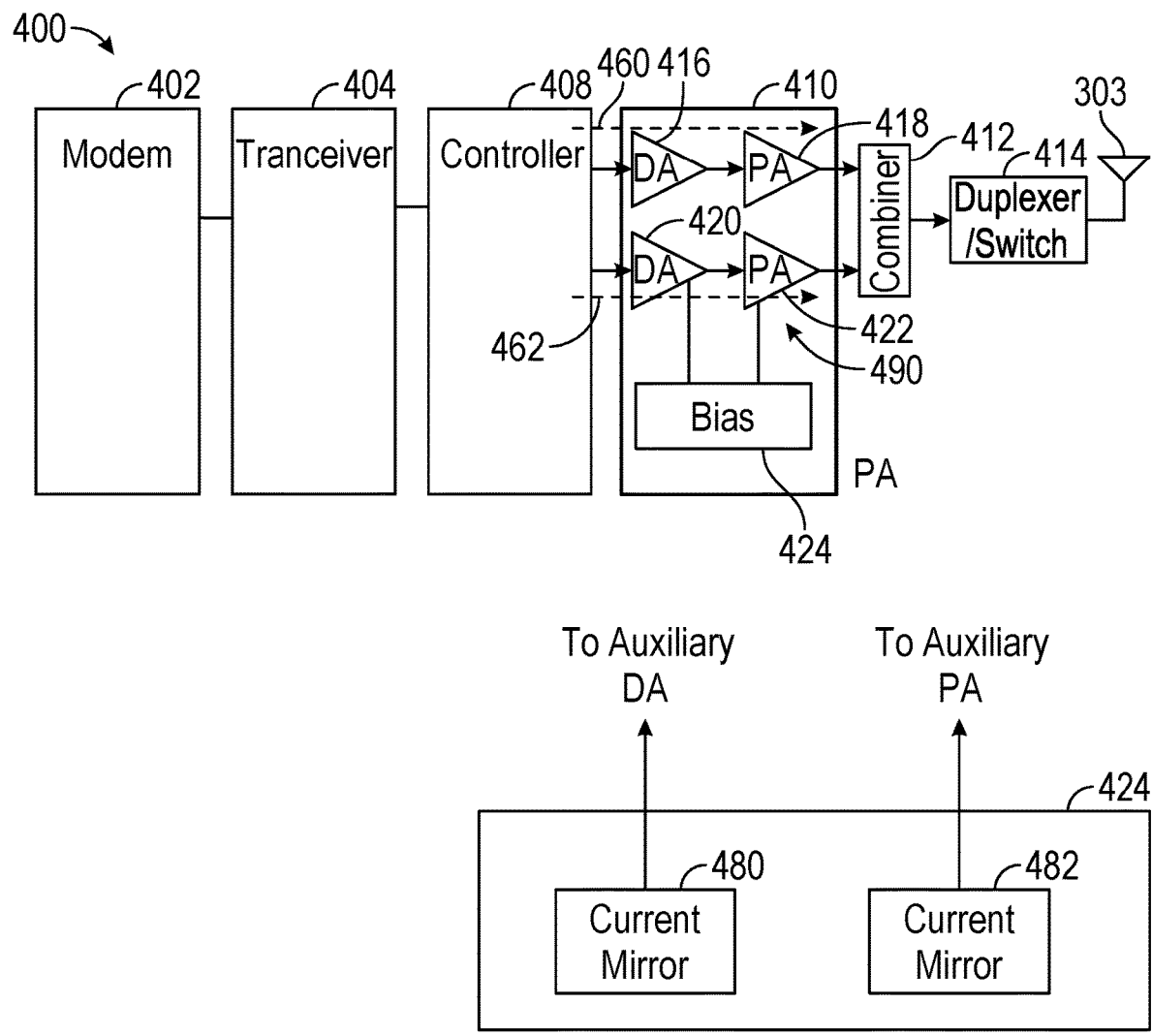
FIG. 4 illustrates an example transmit circuit implemented with a Doherty power amplifier (PA) and with a static bias circuit therefor.

FIG. 4 illustrates an example transmit circuit 400 implemented with a Doherty PA 410, in accordance with certain aspects of the present disclosure. As shown, the transmit chain 400 may include a modem 402 coupled to a transceiver 404. The transceiver 404 may be coupled to a controller 408 for controlling, among other things, bias signaling for the PA 410. The PA 410 may also include amplification circuitry 490 with a main PA path 460, which may include a main DA 416 driving a main PA 418, and an auxiliary PA path 462, which may include an auxiliary DA 420 driving an auxiliary PA 422, as illustrated. For other aspects, the main DA 416 and/or the auxiliary DA 420 may be absent from the amplification circuitry 490. The outputs of the main PA 418 and auxiliary PA 422 may be provided to a combiner 412 for generating a combined PA output that may be provided to an interface 414 (e.g., corresponding to interface 306), which may include a duplexer and/or a switch, for transmission via an antenna 303.

In some aspects, the PA 410 may include a bias circuit 424. The bias circuit 424 may include one or more current mirrors (or other suitable current sources) for generating bias currents for the auxiliary DA 420 and/or the auxiliary PA 422, and in some aspects, the main DA 416 and/or the main PA 418. For example, the bias circuit 424 may include a current mirror 480 for generating a bias current to be provided to the auxiliary DA 420 and/or a current mirror 482 for generating a bias current to be provided to the auxiliary PA 422. The bias currents generated by the current mirrors 480, 482 may be proportional to one or more currents from a current source (not shown). The current source circuitry input may be used to set the bias settings of the PA 410.

The combiner 412 and bias settings of the Doherty PA 410 may be tuned for a target signal with a given peak-to-average power ratio (PAPR). The PAPR may be different depending on power settings which may be specific to some waveforms. For example, the PAPR may be different depending on a maximum power reduction (MPR) parameter setting specific to a waveform or group of waveforms. To increase the power-added efficiency (PAE), the auxiliary PA may be turned on and off based on an average amplifier output power. For example, when the output power of the PA 410 is greater than the average output power, the auxiliary amplification path may be turned on, and when the output power of the PA 410 is less than the average output power, at least a portion of the auxiliary amplification path may be turned off, as described in more detail herein.

Figure 5A:
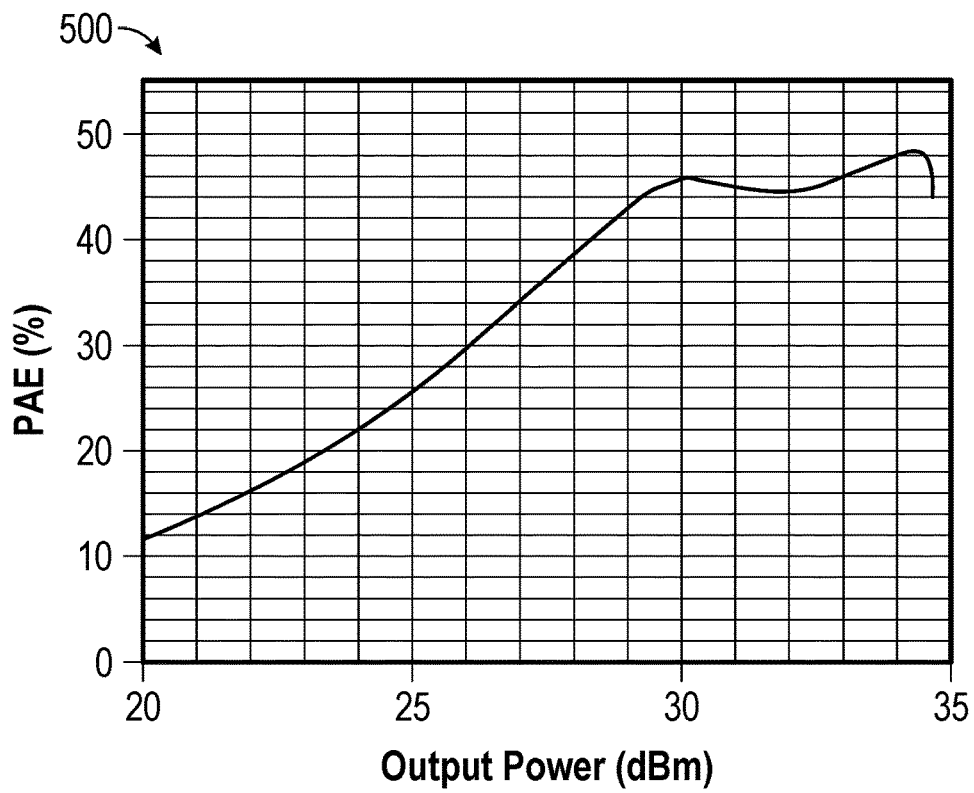
FIG. 5A is a graph illustrating example power-added efficiency (PAE) of a PA as compared to output power.
Figure 5B:
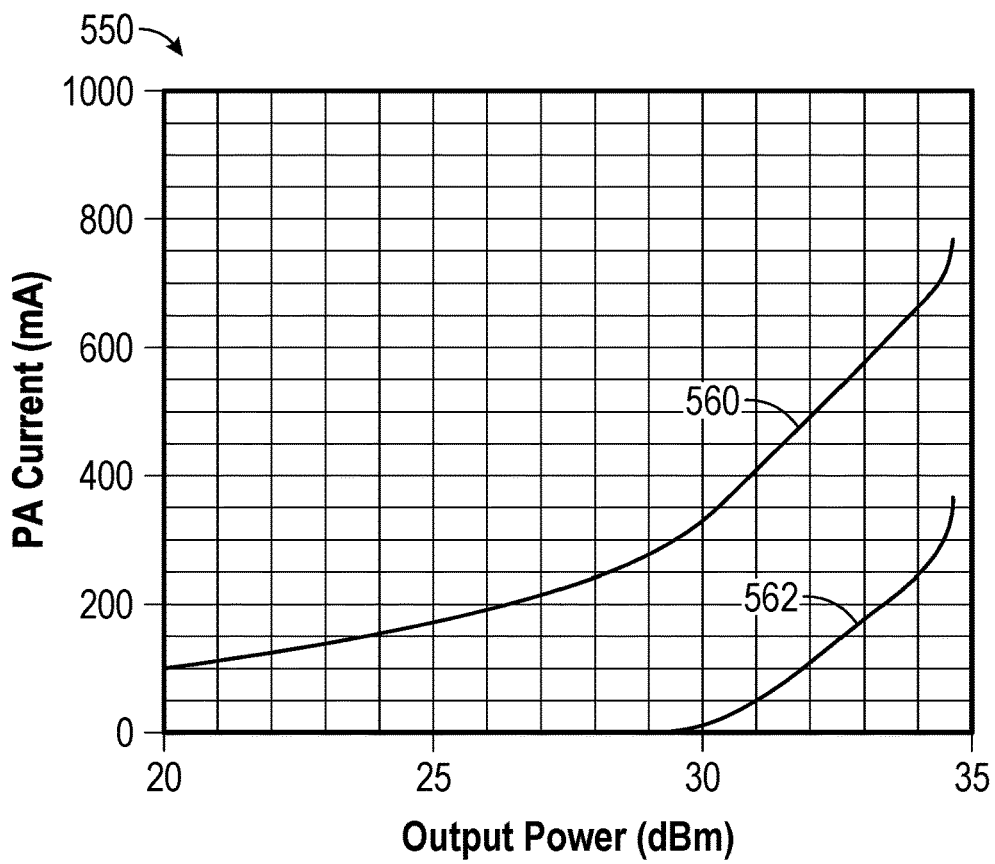
FIG. 5B is a graph illustrating example main PA current and example auxiliary PA current at different output powers.

FIG. 5A is graph 500 illustrating the PAE of a PA (e.g., Doherty PA 410) as compared to output power in dBm. FIG. 5B is a graph 550 illustrating main PA current (shown by curve 560) and auxiliary PA current (shown by curve 562) in mA versus output power in dBm. The graphs 500, 550 show the PAE and main/auxiliary PA currents for a PA configured for a 4.5 dB MPR. As shown in graph 500 of FIG. 5A, the PAE of the PA increases linearly from 20 dBm to 30 dBm, but is fairly constant from 30 dBm to 35 dBm. As shown in graph 550 of FIG. 5B, the main PA provides about 100 mA of current (as shown by curve 560) at 20 dBm output power to roughly 800 mA of current at 35 dBm output power. The auxiliary PA may begin providing current (shown by curve 562) at an output power of about 30 dBm, for example, facilitating a PAE of about 45% at or above 30 dBm output power. As described, the currents from the main and auxiliary PAs are combined via the combiner 412. Without the auxiliary PA, the PAE shown in graph 500 would drop after 30 dBm output power.

The PA bias may be tuned for a specific signal transmission configuration (e.g., PAPR). The PAE of the PA may drop if the PAPR of the actual signal transmission is different (e.g., higher or lower) than the PAPR for which the PA bias was set. For a PA having a static or fixed bias, the PA may be set for a particular PAPR, while the wireless device including the PA may have to support signals with different characteristics (e.g., different PAPRs).

Certain aspects of the present disclosure are directed towards a dynamic bias setting for a PA, such as a Doherty PA. For example, based on one or more configuration parameters (e.g., statistical waveform characteristics), the bias settings for the amplification circuitry 490 may be adjusted. The one or more configuration parameters (e.g., PAPR or MPR) may be indicative of an average power level of a signal to be transmitted.

Figure 6:
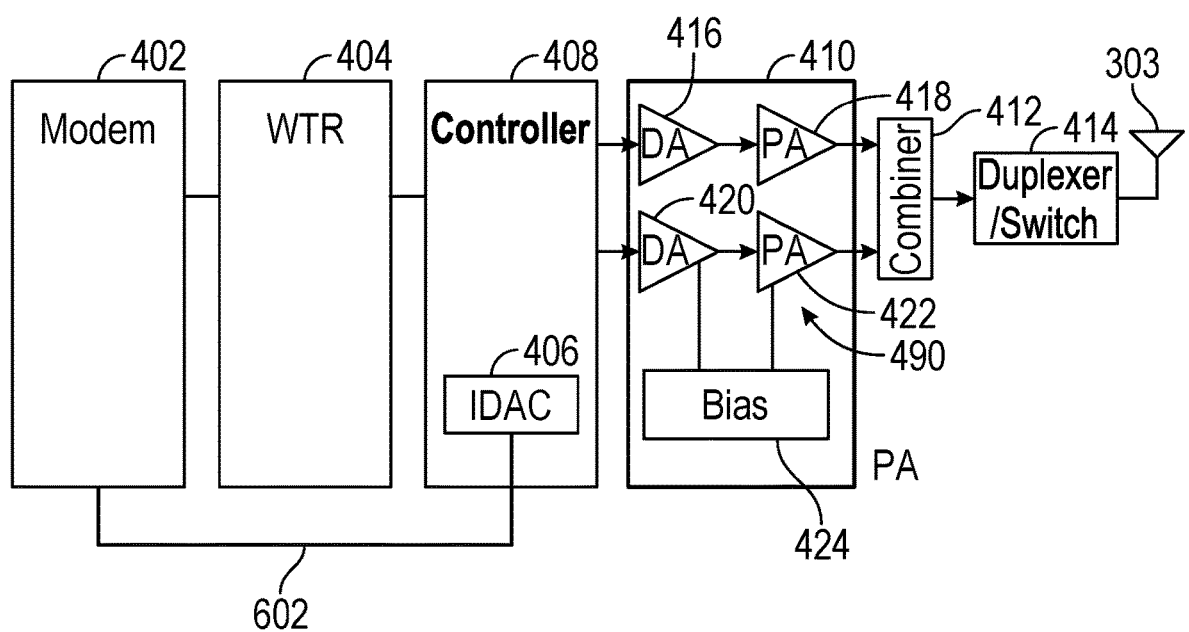
FIG. 6 illustrates an example transmit circuit with a feedforward path from a modem for setting at least one amplifier bias, where the bias for an auxiliary amplification path (and for a main amplification path) can be dynamically adjusted, in accordance with certain aspects of the present disclosure.

FIG. 6 illustrates an example transmit circuit 400 with a feedforward path 602 from the modem 402 to the controller 408 for setting a PA bias, in accordance with certain aspects of the present disclosure. In some aspects, the feedforward path 602 may include a mobile industry processor interface (MIPI) bus. Using the feedforward path 602, a bias code (or other suitable control signal) may be provided to an IDAC 406 (e.g., of controller 408), which may be used to generate a current to be provided to the bias circuit 424 for biasing the auxiliary DA and/or the auxiliary PA 422, as described herein. In some aspects, the modem 402 may select a bias code (e.g., retrieve from memory, such as in a look-up table (LUT)) based on a waveform (or waveform grouping) to be used for transmission. While the bias code may correspond to a configured MPR (or PAPR) associated with a waveform (or groups of waveforms), other configuration parameters may be considered to identify the bias code to be used.

Figure 7:
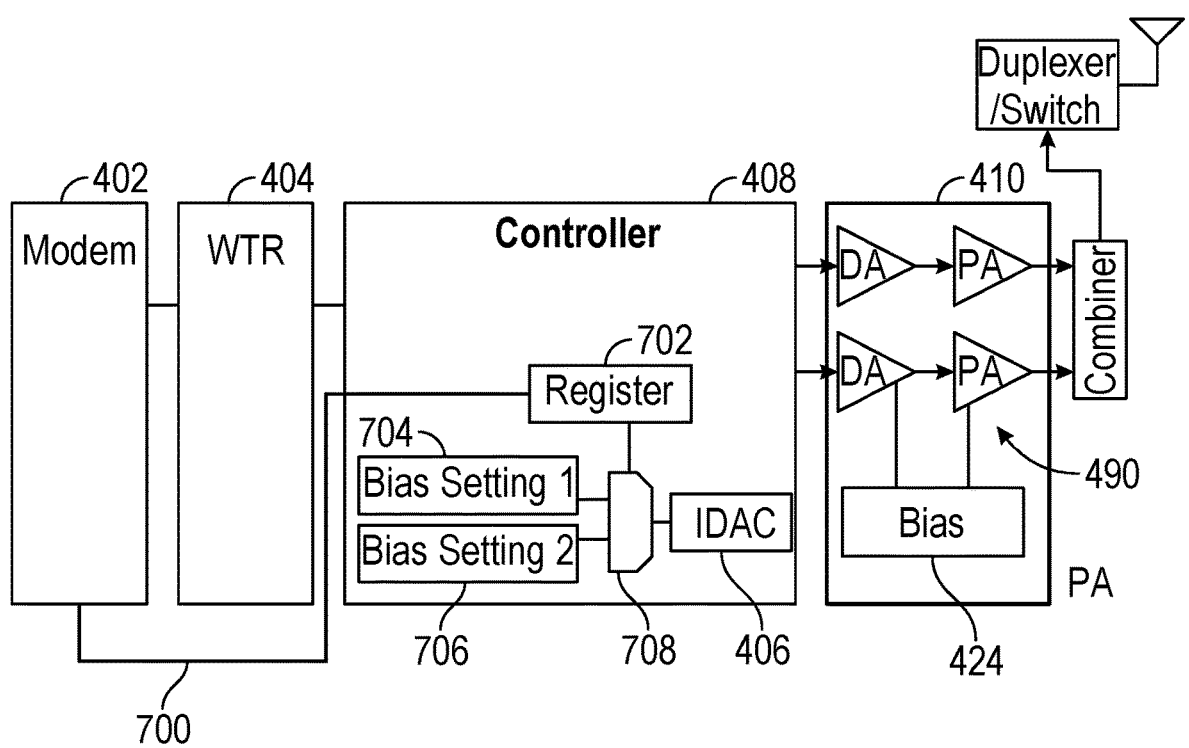
FIG. 7 illustrates an example transmit circuit with a feedforward path providing a configuration parameter associated with a waveform for transmission for setting at least one amplifier bias, where the bias for the auxiliary amplification path (and for the main amplification path) can be dynamically adjusted, in accordance with certain aspects of the present disclosure.

FIG. 7 illustrates an example transmit circuit 400 with a feedforward path 700 providing a configuration parameter (or other suitable information) associated with a waveform for transmission, in accordance with certain aspects of the present disclosure. For example, the modem 402 may provide the configuration parameter, which may be saved in a register 702 of the controller 408. In some aspects, the configuration parameter may include an MPR parameter. The controller 408 may decode the configuration parameter to establish the bias current for the amplification circuitry 490. For example, the controller 408 may include a multiplexer circuit 708 coupled to bias-setting registers 704, 706. A control input of the multiplexer circuit 708 may be coupled to the feedforward path 700. The bias-setting registers 704, 706 may include respective bias codes, one of which may be selected by the multiplexer circuit 708 based on the configuration parameter stored in the register 702. The multiplexer circuit 708 may provide the selected bias code to the IDAC 406 for generating a current to be provided to the bias circuit 424 to be used for biasing the amplification circuitry 490.

In some aspects of the present disclosure, adjusting the bias current(s) provided to the amplification circuitry 490 (e.g., the auxiliary DA and/or the auxiliary PA) may adjust the power at which the auxiliary DA and/or PA begins to provide current to the combiner 412. For example, as the average of the PA output power decreases (e.g., corresponding to an increase in PAPR and a decrease in MPR), the bias code may be adjusted (e.g., decreased) so that the auxiliary PA path begins providing current to the combiner 412 at a lower power.

The bias setting for the amplification circuitry 490 may be adjusted at any suitable level of temporal granularity. For example, the bias setting may be adjusted for each symbol associated with signal transmission. In other words, for each symbol, a new bias code or configuration parameter may be provided by the modem to the controller for setting the bias current for the amplification circuitry 490. That is, different symbols may correspond to different bias signals for biasing the PA 410. While examples provided herein have been described with respect to dynamically adjusting the bias setting for the auxiliary PA path 462, the bias setting for the main PA path 460 may be adjusted in some cases based on information from the feedforward path 602 or 700. In some cases, input driving signals may be adjusted based on the information from the feedforward path 602 or 700. In some aspects, a configuration of the combiner 412 may be adjusted based on the information from the feedforward path 602 or 700.

Figure 8:
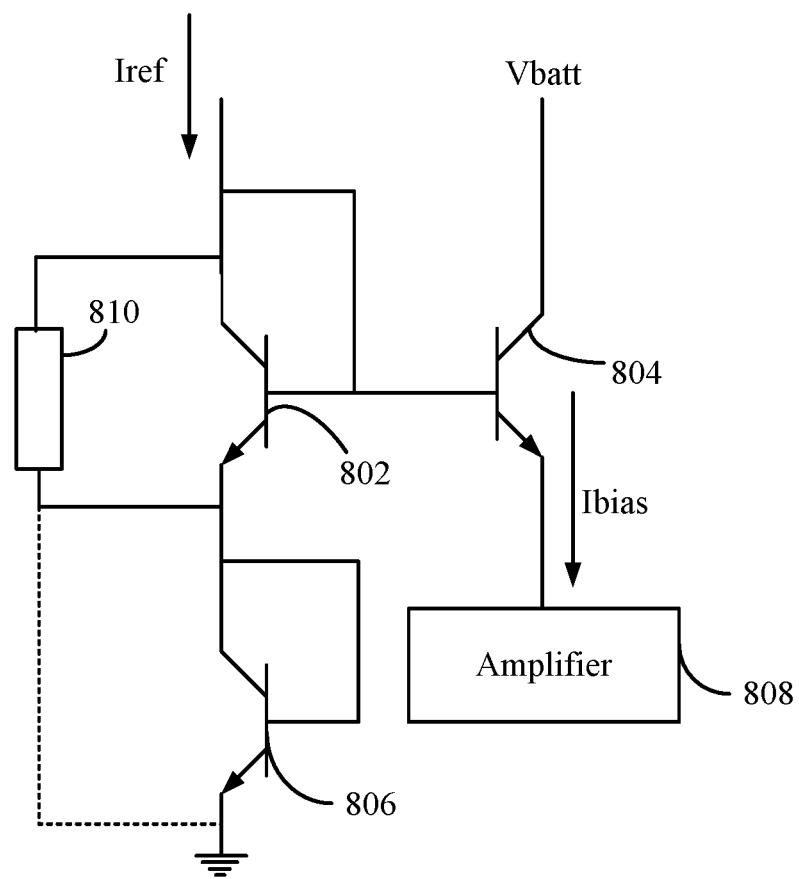
FIG. 8 illustrates an example biasing circuit, in accordance with certain aspects of the present disclosure.

FIG. 8 illustrates an example biasing circuit 800, in accordance with certain aspects of the present disclosure. The biasing circuit 800 may include a current mirror having transistors 802, 804. The current mirror may correspond to the current mirror 480 or current mirror 482. As shown, a diode-connected transistor 806 may be coupled between the transistor 802 and a reference potential node (e.g., electrical ground). A reference current (Iref) may be provided to the collector of transistor 802, which may be mirrored by the current mirror to generate a bias current (Ibias) provided to an amplifier 808. The amplifier 808 may correspond to the main DA, the main PA, the auxiliary DA, or auxiliary PA, as described herein. Iref may correspond to an output current from a current source, such as the IDAC 406. In some aspects, a resistive element 810 may be coupled between a collector of the transistor 802 and an emitter of transistor 802 (or coupled between a collector of transistor 802 and a reference potential node, as shown).

Figure 9:
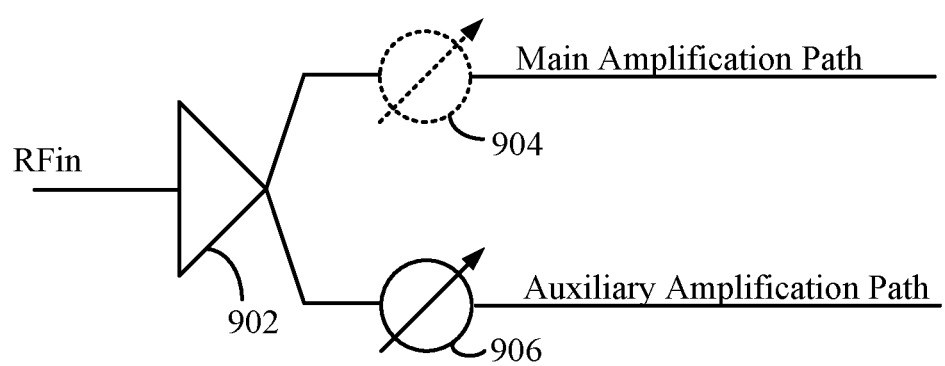
FIG. 9 illustrates a splitter circuit and a phase shifter, in accordance with certain aspects of the present disclosure.

FIG. 9 illustrates a splitter circuit 902 and a phase shifter 906, in accordance with certain aspects of the present disclosure. In some aspects, the controller 408 may include the splitter circuit 902 and the phase shifter 906. For example, the controller 408 may include the splitter circuit 902 (e.g., a Wilkinson splitter) providing a signal for the main amplification path and a signal for the auxiliary amplification path, as shown. The phase shifter 906 may be included on the auxiliary amplification path in the controller 408. The input to the splitter circuit 902 may be an RF signal (labeled "RFin") from the transceiver 404 and the outputs of the splitter circuit 902 may be two balanced or imbalanced phase-coherent signals. In some aspects, a phase shifter (e.g., phase shifter 906) may be implemented only on the auxiliary amplification path after the splitter circuit 902. In some aspects, a phase shifter 904 may also be implemented on the main amplification path, as shown. The outputs from the splitter circuit and phase shifter circuit(s) may include phase-shifted and amplitude-balanced (or imbalanced) signals that are provided to the inputs of the main DA or auxiliary DA. In some aspects, the splitter circuit and phase shifter(s) may be part of the controller 408, implemented between the controller 408 and the Doherty PA 410 (e.g., on a printed circuit board (PCB) or laminate), or may be implemented as part of the Doherty PA 410.

Figure 10:
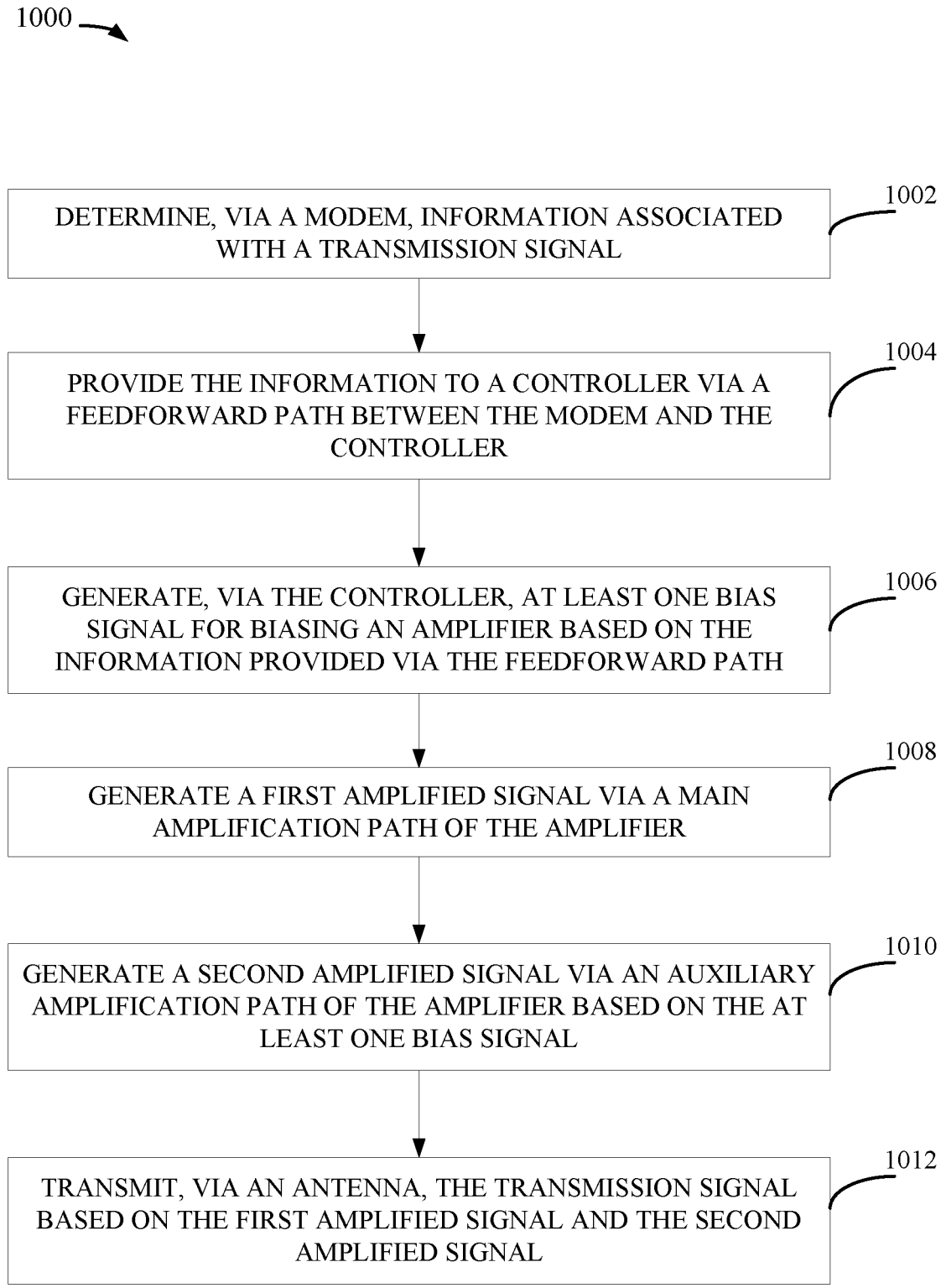
FIG. 10 is a flow diagram depicting example operations for wireless communication, in accordance with certain aspects of the present disclosure.

FIG. 10 is a flow diagram depicting example operations 1000 for wireless communication, in accordance with certain aspects of the present disclosure. For example, the operations 1000 may be performed by a wireless communication circuit, such as the transmit circuit 400.

The operations 1000 begin, at block 1002, with the communication circuit determining, via a modem (e.g. modem 402), information associated with a transmission signal. At block 1004, the communication circuit provides the information to a controller (e.g., controller 408 or a bias controller) via a feedforward path (e.g., feedforward path 602 or 700) between the modem and the controller. In some aspects, the information includes a bias code, and the at least one bias signal may be generated based on the bias code. In some aspects, the information may include one or more configuration parameters, and the at least one bias signal may be generated based on the one or more configuration parameters. For example, the one or more configuration parameters may indicate a PAPR associated with the transmission signal. Additionally or alternatively, the one or more configuration parameters may include an MPR parameter, for example.

At block 1006, the communication circuit generates, via the controller, at least one bias signal for biasing an amplifier (e.g., PA 410) based on the information provided via the feedforward path. Generating the at least one bias signal may include dynamically adjusting the at least one bias signal based on the information. In some aspects, the at least one bias signal may include a current generated by an IDAC (e.g., IDAC 406) of the controller. The communication circuit may generate, via a bias circuit (e.g., bias circuit 424), a bias current for the amplifier based on the current generated by the IDAC. For example, generating the bias current via the bias circuit may include mirroring (e.g., replicating a proportional version of), via one or more current mirrors, the current from the IDAC.

In some aspects, the communication circuit selects, via a multiplexer circuit (e.g., multiplexer circuit 708) of the controller, a bias setting stored in a first bias-setting register (e.g., register 704) or a second bias-setting register (e.g., register 706) based on the information provided via the feedforward path. The at least one bias signal may be generated based on the bias setting.

At block 1008, the communication circuit generates a first amplified signal via a main amplification path (e.g., main PA path 460) of the amplifier. At block 1010, the communication circuit generates a second amplified signal via an auxiliary amplification path (e.g., auxiliary PA path 462) of the amplifier based on the at least one bias signal. For example, the at least one bias signal may be for biasing an auxiliary DA (e.g., auxiliary DA 420) of the auxiliary amplification path or an auxiliary PA (e.g., auxiliary PA 422) of the auxiliary amplification path.

At block 1012, the communication circuit transmits, via an antenna (e.g., antenna 303), the transmission signal based on the first amplified signal and the second amplified signal. For certain aspects, the first amplified signal and the second amplified signal may be combined and/or processed (e.g., filtered) before being transmitted via the antenna.

Example Aspects

Aspect 1: An apparatus for wireless communication, comprising: a modem; a controller; a feedforward path coupled between the modem and the controller; and an amplifier having a main amplification path and an auxiliary amplification path, wherein the controller is configured to provide at least one bias signal for biasing at least the auxiliary amplification path based on information associated with a transmission signal, the information being provided by the modem to the controller via the feedforward path.

Aspect 2: The apparatus of Aspect 1, wherein the information includes a bias code used to provide the at least one bias signal for biasing the amplifier.

Aspect 3: The apparatus of Aspect 1 or 2, wherein the information includes one or more configuration parameters and wherein the controller is configured to provide the at least one bias signal based on the configuration parameter.

Aspect 4: The apparatus of Aspect 3, wherein the one or more configuration parameters indicate a peak-to-average power ratio (PAPR) associated with a signal transmission via the amplifier.

Aspect 5: The apparatus of Aspect 3 or 4, wherein the one or more configuration parameters include a maximum power reduction (MPR) parameter.

Aspect 6: The apparatus according to any of Aspects 1-5, wherein the controller is configured to dynamically adjust the at least one bias signal based on the information provided by the modem.

Aspect 7: The apparatus according to any of Aspects 1-6, wherein the controller includes a current digital-to-analog converter (IDAC) and wherein the at least one bias signal includes a current provided via the IDAC.

Aspect 8: The apparatus of Aspect 7, wherein the amplifier includes a bias circuit configured to: receive the current from the IDAC; and generate at least one bias current for the amplifier based on the current from the IDAC.

Aspect 9: The apparatus of Aspect 8, wherein the bias circuit includes one or more current mirrors configured to mirror the current from the IDAC to generate the at least one bias current.

Aspect 10: The apparatus according to any of Aspects 7-9, wherein the controller comprises a multiplexer circuit having: a control input coupled to the feedforward path; inputs coupled to a first bias-setting register and a second bias-setting register; and an output coupled to an input of the IDAC.

Aspect 11: The apparatus of Aspect 10, wherein: the multiplexer circuit is configured to select a bias setting stored in the first bias-setting register or the second bias-setting register based on the information provided via the feedforward path; and the controller is configured to provide the at least one bias signal based on the bias setting.

Aspect 12: The apparatus according to any of Aspects 1-11, wherein: the main amplification path comprises a main driver amplifier (DA) and a main power amplifier (PA); and the auxiliary amplification path comprises an auxiliary DA and an auxiliary PA, outputs of the main PA and auxiliary PA being coupled to inputs of a combiner.

Aspect 13: The apparatus of Aspect 12, wherein the controller is configured to provide the at least one bias signal to bias at least one of the auxiliary DA or the auxiliary PA.

Aspect 14: The apparatus according to any of Aspects 1-13, wherein: to provide the information, the modem is configured to provide information for each symbol of a plurality of symbols associated with a transmission signal; and to provide the at least one bias signal, the controller is configured to provide different bias signals for the plurality of symbols based on the information for each symbol of the plurality of symbols.

Aspect 15: A method for wireless communication, comprising: determining, via a modem, information associated with a transmission signal; providing the information to a controller via a feedforward path between the modem and the controller; generating, via the controller, at least one bias signal for biasing an amplifier based on the information provided via the feedforward path; generating a first amplified signal via a main amplification path of the amplifier; generating a second amplified signal via an auxiliary amplification path of the amplifier based on the at least one bias signal; and transmitting, via an antenna, the transmission signal based on the first amplified signal and the second amplified signal.

Aspect 16: The method of Aspect 15, wherein the information includes a bias code and wherein the at least one bias signal is generated based on the bias code.

Aspect 17: The method of Aspect 15 or 16, wherein the information includes one or more configuration parameters, the at least one bias signal being generated based on the one or more configuration parameters.

Aspect 18: The method of Aspect 17, wherein the one or more configuration parameters indicate a peak-to-average power ratio (PAPR) associated with the transmission signal.

Aspect 19: The method of Aspect 17 or 18, wherein the one or more configuration parameters include a maximum power reduction (MPR) parameter.

Aspect 20: The method according to any of Aspects 15-19, wherein generating the at least one bias signal includes dynamically adjusting the at least one bias signal based on the information.

Aspect 21: The method according to any of Aspects 15-20, wherein the at least one bias signal incudes a current generated by a current digital-to-analog converter (IDAC) of the controller.

Aspect 22: The method of Aspect 21, further comprising generating, via a bias circuit, at least one bias current for the amplifier based on the current generated by the IDAC.

Aspect 23: The method of Aspect 22, wherein generating the at least one bias current via the bias circuit includes mirroring, via one or more current mirrors, the current from the IDAC.

Aspect 24: The method according to any of Aspects 15-23, further comprising selecting, via a multiplexer circuit of the controller, a bias setting stored in a first bias-setting register or a second bias-setting register based on the information provided via the feedforward path, wherein the at least one bias signal is generated based on the bias setting.

Aspect 25: The method according to any of Aspects 15-24, wherein the at least one bias signal is for biasing an auxiliary driver amplifier of the auxiliary amplification path or an auxiliary power amplifier of the auxiliary amplification path.

Aspect 26: The method according to any of Aspects 15-25, wherein: providing the information includes providing information for each symbol of a plurality of symbols associated with the transmission signal; and the at least one bias signal comprises different bias signals for the plurality of symbols based on the information for each symbol of the plurality of symbols.

Aspect 27: An apparatus for wireless communication, comprising: a modem configured to generate information associated with a transmission signal; means for generating at least one bias signal based on the information, wherein the information is provided via a means for sending the information from the modem to the means for generating the at least one bias signal; an amplifier including: a main amplification path configured to generate a first amplified signal; and an auxiliary amplification path configured to generate a second amplified signal based on the at least one bias signal; and means for transmitting the transmission signal based on the first amplified signal and the second amplified signal.

ADDITIONAL CONSIDERATIONS

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B and object B touches object C, then objects A and C may still be considered coupled to one another-even if objects A and C do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits.

The apparatus and methods described in the detailed description are illustrated in the accompanying drawings by various blocks, modules, components, circuits, steps, processes, algorithms, etc. (collectively referred to as "elements"). These elements may be implemented using hardware, for example.

One or more of the components, steps, features, and/or functions illustrated herein may be rearranged and/or combined into a single component, step, feature, or function or embodied in several components, steps, or functions. Additional elements, components, steps, and/or functions may also be added without departing from features disclosed herein. The apparatus, devices, and/or components illustrated herein may be configured to perform one or more of the methods, features, or steps described herein.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover at least: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." For example, means for sending may include a feedforward path, such as the feedforward path 602 or 700. Means for generating may include a controller such as the controller 408 and/or a bias circuit such as the bias circuit 424. Means for transmitting may include an antenna, such as the antenna 303.

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. An apparatus for wireless communication, comprising:
a modem;
a controller;
a feedforward path coupled between the modem and the controller; and
an amplifier having a main amplification path and an auxiliary amplification path, wherein the controller is configured to provide at least one bias signal for biasing at least the auxiliary amplification path based on information associated with a transmission signal, the information being provided by the modem to the controller via the feedforward path.

2. The apparatus of claim 1, wherein the information includes a bias code used to provide the at least one bias signal for biasing the amplifier.

3. The apparatus of claim 1, wherein the information includes one or more configuration parameters and wherein the controller is configured to provide the at least one bias signal based on the configuration parameter.

4. The apparatus of claim 3, wherein the one or more configuration parameters indicate a peak-to-average power ratio (PAPR) associated with a signal transmission via the amplifier.

5. The apparatus of claim 3, wherein the one or more configuration parameters include a maximum power reduction (MPR) parameter.

6. The apparatus of claim 1, wherein the controller is configured to dynamically adjust the at least one bias signal based on the information provided by the modem.

7. The apparatus of claim 1, wherein the controller includes a current digital-to-analog converter (IDAC) and wherein the at least one bias signal includes a current provided via the IDAC.

8. The apparatus of claim 7, wherein the amplifier includes a bias circuit configured to:
receive the current from the IDAC; and
generate at least one bias current for the amplifier based on the current from the IDAC.

9. The apparatus of claim 8, wherein the bias circuit includes one or more current mirrors configured to mirror the current from the IDAC to generate the at least one bias current.

10. The apparatus of claim 7, wherein the controller comprises a multiplexer circuit having:
a control input coupled to the feedforward path;
inputs coupled to a first bias-setting register and a second bias-setting register; and
an output coupled to an input of the IDAC.

11. The apparatus of claim 10, wherein:
the multiplexer circuit is configured to select a bias setting stored in the first bias-setting register or the second bias-setting register based on the information provided via the feedforward path; and
the controller is configured to provide the at least one bias signal based on the bias setting.

12. The apparatus of claim 1, wherein:
the main amplification path comprises a main driver amplifier (DA) and a main power amplifier (PA); and
the auxiliary amplification path comprises an auxiliary DA and an auxiliary PA, outputs of the main PA and auxiliary PA being coupled to inputs of a combiner.

13. The apparatus of claim 12, wherein the controller is configured to provide the at least one bias signal to bias at least one of the auxiliary DA or the auxiliary PA.

14. The apparatus of claim 1, wherein:
to provide the information, the modem is configured to provide information for each symbol of a plurality of symbols associated with a transmission signal; and
to provide the at least one bias signal, the controller is configured to provide different bias signals for the plurality of symbols based on the information for each symbol of the plurality of symbols.

15. A method for wireless communication, comprising:
determining, via a modem, information associated with a transmission signal;
providing the information to a controller via a feedforward path between the modem and the controller;
generating, via the controller, at least one bias signal for biasing an amplifier based on the information provided via the feedforward path;
generating a first amplified signal via a main amplification path of the amplifier;
generating a second amplified signal via an auxiliary amplification path of the amplifier based on the at least one bias signal; and
transmitting, via an antenna, the transmission signal based on the first amplified signal and the second amplified signal.

16. The method of claim 15, wherein the information includes a bias code and wherein the at least one bias signal is generated based on the bias code.

17. The method of claim 15, wherein the information includes one or more configuration parameters, the at least one bias signal being generated based on the one or more configuration parameters.

18. The method of claim 17, wherein the one or more configuration parameters indicate a peak-to-average power ratio (PAPR) associated with the transmission signal.

19. The method of claim 17, wherein the one or more configuration parameters include a maximum power reduction (MPR) parameter.

20. The method of claim 15, wherein generating the at least one bias signal includes dynamically adjusting the at least one bias signal based on the information.

21. The method of claim 15, wherein the at least one bias signal incudes a current generated by a current digital-to-analog converter (IDAC) of the controller.

22. The method of claim 21, further comprising generating, via a bias circuit, at least one bias current for the amplifier based on the current generated by the IDAC.

23. The method of claim 22, wherein generating the at least one bias current via the bias circuit includes mirroring, via one or more current mirrors, the current from the IDAC.

24. The method of claim 15, further comprising selecting, via a multiplexer circuit of the controller, a bias setting stored in a first bias-setting register or a second bias-setting register based on the information provided via the feedforward path, wherein the at least one bias signal is generated based on the bias setting.

25. The method of claim 15, wherein the at least one bias signal is for biasing an auxiliary driver amplifier of the auxiliary amplification path or an auxiliary power amplifier of the auxiliary amplification path.

26. The method of claim 15, wherein:
providing the information includes providing information for each symbol of a plurality of symbols associated with the transmission signal; and the at least one bias signal comprises different bias signals for the plurality of symbols based on the information for each symbol of the plurality of symbols.

27. An apparatus for wireless communication, comprising:
- a modem configured to generate information associated with a transmission signal;
- means for generating at least one bias signal based on the information, wherein the information is provided via a means for sending the information from the modem to the means for generating the at least one bias signal;
- an amplifier including:
  - a main amplification path configured to generate a first amplified signal; and
  - an auxiliary amplification path configured to generate a second amplified signal based on the at least one bias signal; and
- means for transmitting the transmission signal based on the first amplified signal and the second amplified signal.

* * * * *